United States Patent

[11] 3,630,306

| [72] | Inventor | Victor Shur<br>Henrietta, N.Y. |
|---|---|---|
| [21] | Appl. No. | 885,666 |
| [22] | Filed | Dec. 17, 1969 |
| [45] | Patented | Dec. 28, 1971 |
| [73] | Assignee | Ralph T. Cerame<br>Rochester, N.Y.<br>a part interest |

[54] IGNITION-CONTROLLED MECHANISM FOR BLOCKING AUTOMOTIVE FUEL LINE
9 Claims, 4 Drawing Figs.

[52] U.S. Cl............................................ 180/114,
70/243, 137/384.6, 137/583, 251/63.5
[51] Int. Cl.............................................. B60r 25/04
[50] Field of Search................................ 180/114,
82; 251/63.5, 63.6; 137/384.2, 383, 384.6, 583;
70/243

[56] References Cited
UNITED STATES PATENTS
3,182,709   5/1965   Fisher.......................... 137/583 X

| 2,904,121 | 9/1959 | Honeyman.................. | 180/114 |
| 2,855,174 | 10/1958 | De Garmo..................... | 251/61.5 |
| 3,427,413 | 2/1969 | Hawkins....................... | 200/44 |
| 2,580,553 | 1/1952 | King............................ | 251/263 X |
| 3,515,442 | 6/1970 | Whittemore................. | 180/114 X |

Primary Examiner—Benjamin Hersh
Assistant Examiner—John P. Silverstrim
Attorney—Shlesinger, Fitzsimmons & Shlesinger ABSTRACT: A first valve in the fuel line of an automotive vehicle is normally spring loaded to closed position in which it blocks the fuel line, when the vehicle's ignition is turned off. The valve is connected to the manifold of the vehicle's engine to be drawn by vacuum to open position, when the engine is running. A second valve, which is closed when the vehicle's ignition key is in ON position, but which is opened, when the ignition key is turned OFF, causes the manifold vacuum merely to suck in air, without opening the first valve, when the engine is turned over, with the ignition OFF so that a would-be thief, without a key to turn on the ignition, cannot start the vehicle.

PATENTED DEC 28 1971 3,630,306

INVENTORS
VICTOR SHUR
BY
Shlesinger, Fitzsimmons & Shlesinger
ATTORNEYS

3,630,306

IGNITION-CONTROLLED MECHANISM FOR BLOCKING AUTOMOTIVE FUEL LINE

This invention relates to automobiles, and more particularly to means for preventing theft of an automotive vehicle. In a more specific aspect, the invention relates to a mechanism for automatically shutting off or blocking the fuel of an automotive vehicle when its ignition switch is turned to "OFF" position.

Each year thousands of automobiles are stolen. Numerous inventions have been devised, therefore, in an effort to render automotive vehicles theftproof whenever the ignition key is turned off and removed from the ignition lock of a vehicle. Among these have been apparatus for automatically blocking the fuel line of the vehicle. A major disadvantage of such prior mechanisms, however, is that they have been relatively expensive to manufacture, and as a consequence have been rather impractical.

It is an object of this invention to provide an improved device for automatically blocking the fuel line of an automotive vehicle whenever its ignition key is turned off.

Another object of this invention is to provide for a device of the type described a novel, vacuum-operated valve, which is controlled by the ignition key of an automotive vehicle to block the fuel line thereof whenever the ignition key is in its "OFF" position.

A still further object of this invention is to provide an improved fuel line blocking device, which is substantially simpler, more compact, and less expensive to manufacture than prior such devices.

Other object of the invention will be apparent thereinafter from the specification and from the recital of the appended claims, particularly when read in conjunction with the accompanying drawing.

Figure 1:
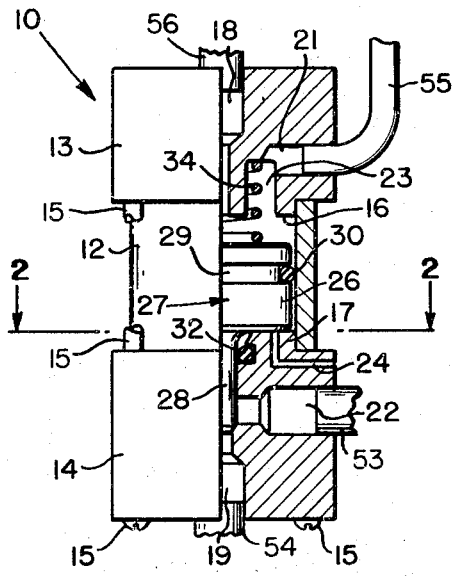
FIG. 1 is an elevational view, partly in section, of a novel value, which forms part of a fuel line blocking mechanism made in accordance with one embodiment of this invention.
Figure 2:
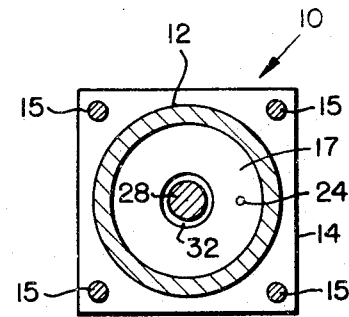
FIG. 2 is a sectional view taken along the line 2—2 in FIG. 1 looking in the direction of the arrows.

Referring now to the drawing by numerals of reference, and first to FIGS. 1 and 2, 10 denotes generally a vacuum-operated valve comprising a tubular pilot cylinder or sleeve 12, which is closed at opposite ends by a pilot head 13 and a valve body 14, respectively. These closure members are axially bored and have reduced-diameter annular collars or bosses 16 and 17, respectively, which project snugly into opposite ends of the sleeve 12 coaxially thereof. They are square in cross section and are releasably secured over opposite ends of the sleeve by a plurality of screws or tie bolts 15, which extend through the end member 14 and thread into member 13.

The members 13 and 14 have bores 18 and 19, respectively, which communicate with the bore of sleeve 12. Intermediate their ends the members 13 and 14 have radial ports or ducts 21 and 22, respectively. At its inner end duct 21 opens on an annular recess 23, which is formed coaxially in the member 13 radially outwardly of its bore 18; and at its inner end port 22 opens directly on the bore 19 of member 14. A further, generally right angular duct 24 in member 14 opens at its inner end on the end face of the boss 17, and at its outer end on the exterior of member 14 at a point spaced from duct 22, thereby to vent the bore of sleeve 12.

Mounted to reciprocate in sleeve 12 axially thereof is the enlarged-diameter head 26 of a piston-type valve 27, whose stem portion 28 projects slidably into the bore 19 of member 14. Secured in a circumferential recess 29 formed in the periphery of valve head 26 is a resilient cup or O-ring seal 30, the outer surface of which has sliding engagement with the bore wall of the sleeve 12. A similar seal 32 is secured in an annular recess formed in bore 19 of member 14 to have sliding, sealing engagement with the valve stem 28.

A coiled compression spring 34 is seated at one end against the bottom of the recess 23 in member 13, and at its opposite end engages the valve head 26 normally to hold the valve 27 resiliently in closed position (FIG. 1) In this position the valve head 26 seals the inner end of the vent 24; and the stem 28 seals the inner end of port 22, thus to shut off the port 22 from the bore 19.

Figure 3:
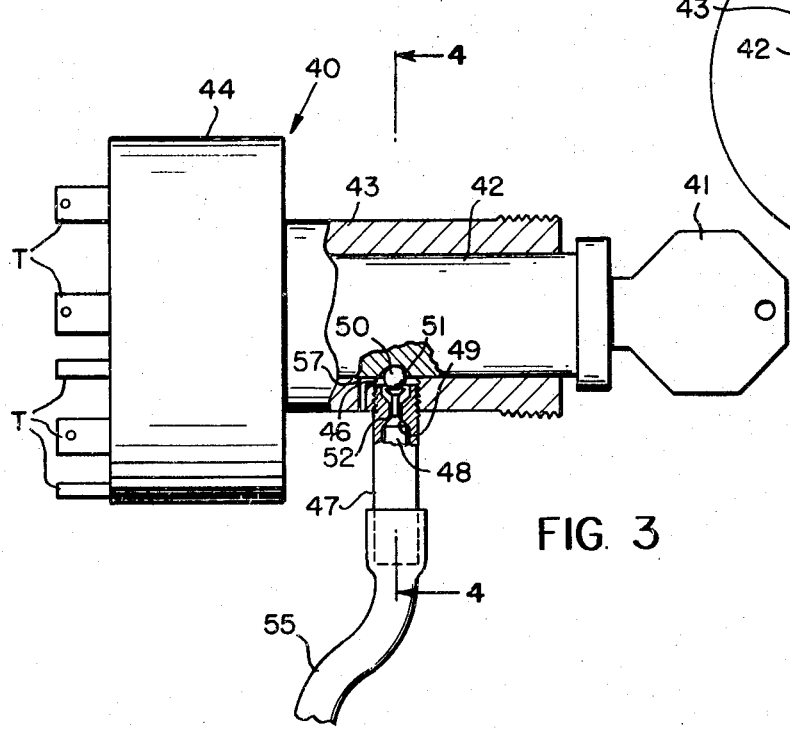
FIG. 3 is a side elevational view of a key-operated automotive ignition lock, which forms a further part of this fuel line blocking mechanism.
Figure 4:
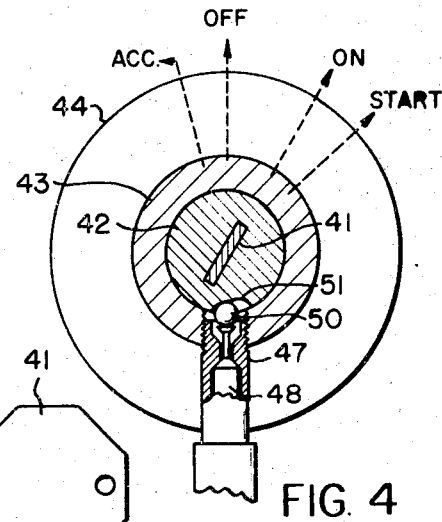
FIG. 4 is a fragmentary sectional view taken along the line 4—4 in FIG. 3 looking in the direction of the arrows, and illustrating schematically different positions into which the key for this lock may be rotated.

The valve 10 is adapted to be mounted in an automotive vehicle having an internal-combustion engine whose ignition is controlled by a lock 40 (FIGS. 3 and 4). This lock is adapted to be operated by a conventional ignition key 41 that is adapted to be inserted in cylindrical barrel 42, which is rotatably mounted in the annular stem portion 43 of a conventional ignition key housing 44. Housing 44 is secured in conventional manner in the dashboard of the vehicle with its terminals T connected in known manner to the vehicle's ignition and accessory circuits.

Threaded at its inner end into a radial port 46, which if formed in the housing stem 43, is a tubular valve housing 47 containing a spring-loaded, reciprocable valve 48 of the type commonly employed in inflatable tire tubes. This valve is normally held resiliently in closed position against an internal conical seat 49 formed in the bore of housing 47.

Mounted in the inner end of port 46 between the barrel 42 and the stem of valve 48 is a ball 50. When the key 41 is in its ON or START position as illustrated, for example, by the the broken lines and arrows in FIG. 4, the upper portion of ball 50 projects into an arcuate recess 51 formed in the outer periphery of barrel or tumbler 42. In this position valve 48 is closed. However, when the key 41 is rotated to rotate tumbler 42 either to its OFF or ACC. (accessory) position (FIG. 4), the recess 51 is rotated out of registry with the port 46 and ball 50, and the nonrecessed outer peripheral surface of the barrel 42 drives the ball 50 downwardly (FIGS. 3 and 4) to urge the valve downwardly to force the conical portion 52 of the valve off seat 49, to open valve 48. At this time, therefore, valve housing 47 and line 55 are opened to atmosphere although a duct 57 formed in the housing stem 43. This duct communicates at its inner end with port 46 and at its opposite end opens on the outside of housing stem 43. When the key 41 is rotated to its ON or START position, the recess 51 in the barrel is rotated into registry with the ball 50 so that the spring-loaded valve 48 returns to its closed position, at the same time urging the ball 50 into recess 51.

In use, the valve 10 is connected through port 22 to the fuel line 53 of the vehicle, and through bore 19 in cap 14 and tubing 54 to the vehicle's carburetor. The bore 18 in the cap 13 is connected by tubing 56 to the manifold of the vehicle's engine; and the port 21 is connected by tubing 55 (FIGS. 1 and 3) to the projecting outer end of the valve housing 47.

The function of the valve 10 is to shut off communication between the port 22 and the port 19 and line 54 leading to the carburetor, so that line 54 cannot supply gasolene to the carburetor unless both the port 18 is under vacuum from the engine manifold and the port 21 is blocked through operation of the remote vent control valve 48. If the engine is running, however, so that there is vacuum at port 18, and the tumbler 42 is in the position shown in FIG. 3, so that valve 48 is closed, then the vacuum at port 18 lifts valve 27 off its seat, opening the passage between the gasolene supply line 53 and the carburetor supply line 54, and permitting gasolene to be fed to the engine carburetor. This condition is maintained until the engine is shut off. When ignition is turned off by key 41, however, valve 48 is forced off its seat by tumbler 42, thereby to vent the bore 18 so that spring 34 shifts piston 27 and stem 28 to blocking position so that the passage between ports 22 and 19 is again blocked. Then, if an attempt is made to start the engine without the key 41, and thus without being able to turn barrel 42 to its ON or START position, the vacuum exerted, when the engine is turned over, merely sucks air through duct 57, the open valve 48, and port 21; and the piston 27 and its stem 28 will therefore not be moved, so that the passage between the position, fuel line and the carburetor remains blocked.

The purpose of the duct 24 in member 14 is to vent the lower end of the bore in sleeve 12 during reciprocation of valve 27.

From the foregoing it will be apparent that the instant invention provides relatively simple, inexpensive and compact means for automatically blocking the fuel line of a vehicle when the latter's ignition key is turned off. A major advantage of the fuel line blocking device as disclosed herein is that it is automatically operated to open the fuel line as soon as the ignition key is turned on, and conversely, is automatically shifted to its fuel blocking position as soon as the key is turned off. The operator of the vehicle therefore does not have to remember to trip any additional switches for operating the device. Moreover, even if a thief were to attempt to jump or bypass the ignition terminals controlled by the ignition key, the vehicle still could not be driven even though its crankshaft were to be rotated, because bore 18 would still be vented to atmosphere, and consequently would prevent movement of the valve 27 to its open or unblocking position. The ignition lock 40 thus provides a remote, automatic control for valve 10.

While in the preferred embodiment valve 27 is normally closed, and is opened by the development of a vacuum in the bore 18, when the key is on, the valve 27 could, if desired, be constructed to be a normally open valve connected to the manifold to be closed and shut off the fuel line, when an attempt is made to start the engine without the ignition key. In such case, the tumbler 42 in its ON position would open valve 48 to vent the bore 18 so that the valve 27 would remain in its open or unblocking position.

Having thus described my invention, what I claim is:

1. An ignition-controlled device for selectively and positively blocking the fuel line of an automotive engine of the type having a chamber in which a vacuum is created when the engine is started, comprising
    an ignition lock having a key-operated member movable between engine stopping and starting position, respectively,
    a pair of valve housings,
    a first valve mounted in a first valve chamber in one of said housings, and operatively connected to said key-operated member for movement between open and closed positions upon movement of said member between its stopping and starting positions respectively, said first valve chamber being connected to atmosphere,
    a second pressure-operated valve mounted in a second valve chamber in the other of said housings, and operatively connected in the fuel line of said engine for movement between closed and open positions to block and unblock, respectively, said fuel line,
    means normally holding said second valve in its closed position when said key-operated member is in its engine stopping position, and means for interconnecting said first valve chamber, said second valve chamber, and said engine chamber whereby said second valve is actuated to its open position by said vacuum 2. An ignition-controlled device as defined in claim 1, wherein
    said first valve includes means normally holding it closed, when said member is in its starting position, and
    means is interposed between said member and said first valve to open said first valve, when said member is moved to its engine stopping position.

3. An ignition-controlled device as defined in claim 1, wherein
    said one valve housing is connected to said ignition lock with one end of said first valve chamber open to atmosphere and with the other end thereof connected to said second valve chamber, and said first valve is mounted in said first valve chamber for movement by said key-operated member from a closed position in which it seals said first chamber, to an open position in which it vents both of said valve chambers to atmosphere, when said member is moved to its engine stopping position.

4. An ignition-controlled device as defined in claim 3, wherein
    said other valve housing has therein a first pair of ports for connecting one end of said second valve chamber to said engine and to said fuel line, respectively, and a third port for connecting the opposite end of said second valve chamber to said chamber in said engine, and
    said second valve is mounted in said second valve chamber normally to be urged by said resilient means to its closed position in which it blocks off said first pair of ports from each other, and to be moved to its open position by said pressure change to place said ports in communication, when said member is moved to its engine starting position.

5. An ignition-controlled device as defined in claim 3, wherein
    said key-operated member is cylindrical and is mounted in a bore in said lock for rotation in opposite directions between its stopping and starting position, and
    a movable detent is interposed between said member and said first valve to seat in a recess in the periphery of said member, when the latter is in its starting position, and movable by said member in a direction to open said first valve, when said member is rotated to its stopping position.

6. An ignition-controlled device as defined in claim 4, wherein
    said second valve is a piston-valve reciprocable between opposite ends of said second valve chamber, and operatively sealing off opposite ends of the last-named chamber from each other,
    said third port is adapted to be connected to the manifold of the engine thereby to create a vacuum at said opposite end of said second valve chamber when the engine is started, and
    said other valve housing has therein a fourth port open to atmosphere at its outer end, and opening at its inner end on said one end of said second valve chamber.

7. Mechanism for preventing the theft of an automotive vehicle which has a carburetor, an ignition system, and an engine whose operation is controlled by the ignition system, said mechanism comprising
    a valve block,
    a piston valve reciprocable in a chamber in said valve block,
    said valve block having a first port therein connected to a source of fuel supply for said engine and a second port connected to the carburetor,
    spring means in said block constantly urging said piston valve to its closed position against a valve seat in said block to shut off communication between said ports to block flow of the fuel supply to the carburetor,
    means connecting one end of said chamber to the engine so that vacuum created by operated of the engine will move said piston valve to its open position against the resistance of said spring means,
    a second valve operable when open to vent said one end of said chamber to atmosphere whereby, when said second valve is open, the vacuum created by operation of the engine is insufficient to move said piston valve to unblocking position,
    means for activating and deactivating the ignition system, and
    means operatively connected to the last-named means for opening said second valve when said ignition system is deactivated.

8. Mechanism as claimed in claim 7, wherein said block also has a further port therein for venting said chamber to atmosphere to permit air entrapped between said piston valve and its seat to escape, said further port being so located that it will be closed when said piston valve is in its closed position.

9. Mechanism as claimed in claim 7, wherein said means for activating and deactivating the ignition system comprises a key-operated rotary barrel, and said barrel has a peripheral cam surface operatively connected to said second valve to open said second valve when said barrel is rotated to ENGINE OFF position and to permit said second valve to close when said barrel is rotated to ENGINE ON position.

* * * * *